Patented Mar. 15, 1949

2,464,759

UNITED STATES PATENT OFFICE 2,464,759

WATER-REPELLENT COATING COMPOSITION AND METHOD OF COATING

Thomas P. Camp, Arlington Heights, Ill., assignor to United States Gypsum Company, Chicago, Ill., a corporation of Illinois No Drawing. Application March 30, 1945, Serial No. 585,792

3 Claims. (Cl. 117—65)

The present invention relates to an improved water-repellent composition which may be used either as a coating composition or as an impregnant.

In its broadest aspects, the present invention relates to a composition consisting essentially of asphalt and wax, particularly paraffin wax. The wax is of a type which is not very soluble in the asphalt when in a cold condition, but both the wax and the asphalt are mutually miscible with each other when both of them are substantially in the molten condition. However, upon cooling, the asphalt no longer acts as a solvent for the wax, with the result that the same separates out in extremely small particles, some of which appear upon the surface of the asphalt, giving it the unique property of unwettability by water. By this it is meant to convey the idea that asphalt containing such microscopically separated wax particles cannot be wetted by water, and that if water drops are placed thereon they will have a negative meniscus, and will run about on a horizontal surface of this kind very much as a drop of mercury will run around on a glass or other surface which mercury will not wet. As a corollary to this property of presenting a high degree of non-wettability by water, it follows that if this composition is incorporated with a wettable material which is provided with pores, these pores will not be penetrable by water because water, forming a negative meniscus, will not be drawn or sucked into the pores as would be the case if the particles of which the material is composed were readily wetted by water.

It is well known that if a glass tube is dipped into water, the water will rise therein by capillary action, and will stand at a higher level than the water outside of the tube. Conversely, if a glass tube is dipped into a body of mercury, the level of the mercury inside of the glass tube will actually be below the level of the mercury in the rest of the body thereof, due to the fact that mercury does not wet the glass, and forms what is known as a negative meniscus.

With these preliminary considerations in mind, the object of the present invention will be more readily understood.

One of the objects of the present invention concerns a coating composition capable of imparting to materials to which it is applied, or which contain it, the property of high water-repellence, the said composition consisting essentially of asphalt and paraffin wax in the relative proportions of about from 1 part of asphalt to about 10 parts of asphalt to each 1 part of said wax.

A further object of the invention concerns the method of providing articles and objects with a water-repellent coating which comprises applying thereto a molten coating composition consisting essentially of wax and asphalt in the proportions enumerated in the previous paragraph, followed by heating the objects so as to insure the thorough blending of the wax and the asphalt, whereafter, upon cooling, the wax will separate from the asphalt in the form of minute particles, some of which are oriented at the surface of the asphalt, giving it the property of causing water to form a negative meniscus therewith.

A further object is to coat objects with an emulsion containing wax and asphalt, then to dry the objects at a temperature high enough to melt the wax and asphalt composition, and to cause them to mix with each other, and then to cool the objects, whereby the results mentioned in the previous paragraph will also be attained.

A still further object envisages the incorporation of the composition in a slurry of cementitious material, followed by the setting of the composition and the heating thereof to cause the asphalt and wax to interfuse, and then upon cooling to separate, with the results already hereinabove mentioned.

The present invention has particular utility in the waterproofing of cementitious materials or the coating thereof, and is particularly useful for such objects as are not of a cellulosic or fibrous nature, such as asbestos or cellulose, but rather, consist of individual particles which of themselves have no great degree of permeability. In other words, it is desirable that the composition be applied to such materials as contain interstitial porosity, but of which the material composing the body itself is not itself porous. Examples of such would be Portland cement articles, gypsum articles, Sorel cement articles, and various types of stones which are provided with pores or are of a porous nature. The material can also be applied with success to fabrics made for example of mineral wool or of woven glass fiber. It also is useful for rendering otherwise porous ceramic materials water-repellent. The composition is not intended for use with such materials as woven fibrous fabrics such as cotton, silk, or wool, or with fibrous asbestos mats. The reason for this is somewhat obscure, but may be explained on the basis that fibrous materials produce a sort of filtering effect which negatives the separation of the wax particles, as will hereinafter be more fully explained.

The production of water-resistant gypsum products by use of the present composition is fully described and claimed in applicant's copending application Serial No. 585,791, now Patent Number 2,432,963, filed concurrently with the present application.

It was found that if a composition containing, say, from 1 to 10 parts of asphalt to each part of paraffin wax, was applied to, for example, a non-absorbent surface and then heated and thereafter allowed to cool, a coating would be obtained which, while it would tenaciously cling to the surface, would, on the other hand, be substantially entirely unwettable by aqueous fluids, and particularly ordinary water. As an alternative, an emulsion containing the wax and asphalt mixture could be applied to a non-absorbent surface, evaporated to remove the water, and the object and the coating thereon then heated to cause the coalescence of the wax and the asphalt, whereupon after cooling, the resulting coating would have the water-resisting and water-repelling property occasioned by the separation of the minute wax particles.

This was demonstrated by the following experiment:

A sheet of plate glass was coated with strips of coating compositions having, in the order named, the following composition: (1) pure roll-saturant asphalt having a softening point of 115° F.; (2) part of paraffin wax melting at 122–124° F. plus 1 part of the asphalt; (3) 2 parts of asphalt to 1 of the wax; (4) 4 parts of asphalt to 1 of the wax; (5) 8 parts of asphalt to 1 of wax; (6) the wax alone. Two-inch strips of these compositions having been applied to separate areas of the plate glass, the plate was placed in an oven at 250° F. to 300° F. for ten minutes to remelt the materials and to simulate the conditions which would be encountered during the heating of gypsum or other cementitious compositions containing particles coated with such compositions, and also to let the coating come to a smooth even surface. The plate was then cooled. When thoroughly cool, the plate with its coating was placed under a stream of running cold tap water for 24 hours. When removed from the stream of water, it was found that the water on those strips which contained both wax and asphalt had immediately run off, or collected in small drops having a negative meniscus to the coating. The strip of plain asphalt was completely wetted and remained wet over its entire area. The strip of plain paraffin wax had almost entirely vanished having been practically washed from the glass by the fact that its adherence thereto was so slight that the water was able to penetrate between the wax and the glass and therefore loosened it therefrom, thereby flushing off the wax. An examination of the surfaces of the strips containing the wax showed definitely the presence of a surface film of paraffin, varying in thickness, depending upon the relative ratio of the wax to the asphalt. This would indicate that the asphalt in the composition insures the adherence of the mixture to the surfaces coated thereby while the oriented surface particles of paraffin wax produce the negative meniscus; but the wax is kept from washing away by partially being embedded in the asphalt.

From the above test, it will be evident that the composition has a certain amount of adhesive qualities which are attributable to the asphaltic component, while the water-repellence is occasioned by the particular manner in which the paraffin is oriented on the surface of the asphalt. The effect might be likened in a manner of speaking to what happens when a nasturtium leaf has rain or dew drops thereon. As is well known, water will run about on the nasturtium leaf just like mercury on a piece of paper—that is, without wetting it.

In using the composition, for example, for imparting water resistance to a cementitious mass, this may be accomplished by blending a mixture of wax and asphalt, which may or may not have previously been molten, together with a slurry of cementitious material, and allowing the slurry to set up. Thereafter, the cementitious material may be dried, either naturally or artificially, and then heated to temperature at which both the asphalt and wax will be liquid and mutually miscible with each other. This mixture will then coat the various individual crystal particles of the cementitious material, and after the object is cooled will form a coating thereon exhibiting a negative meniscus to water. By erason of this negative meniscus, water will not penetrate into such a cementitious mass, even though it still be porous. For that reason a very small amount of the composition of the present invention may be used; for instance, as little as 5% of the total weight of the cementitious article.

If a porous ceramic article or stone is to be rendered water-repellent, it suffices to make a molten mixture of wax and asphalt, for instance, 1 part of wax to about 4 of asphalt, and while still molten to apply it thereto, either by means of a brush, a spray gun, or any other suitable means, even including immersion.

If the stone or cementitious object has first been heated, then all that is necessary is to allow the article and the coating thereon to cool. If the material has been chilled too suddenly by the fact that the article was cold, it may be advantageous to warm the article in order to insure the fluxing of the wax and asphalt together, so that after cooling the wax may separate in the desired microscopic form.

For instance, in applying the composition to a cementitious wall, a molten mixture of wax and asphalt in the proportions of from 1 part of wax to 1 part of asphalt up to 1 part of wax to 10 parts of asphalt (preferably 1 part of wax to about 6 parts of asphalt), at a temperature well above the melting point of the two materials, so that it will be freely fluid, is brushed or sprayed onto the wall. After it has cooled it may be desirable to reheat it at the surface, as by running the flame from a blowtorch across it and then again allowing it to cool. This reheating is advantageous in order to produce a nice smooth surface. The material so coated will be absolutely unwettable by water, and hence will prevent any water from penetrating into the cement wall. The utility of such a coating, as for instance for treating cellar walls and the like, particularly on the outside, will be immediately appreciated.

The asphalt used for these purposes is preferably one which has a softening point, as determined by the ring-and-ball method, of about 150° F., and the paraffin wax is preferably of the kind having a melting point around 122–124° F.

The amount of the material which may be incorporated with the cementitious material prior to setting—that is to say, by dispersing it in a slurry thereof, may be between about 5% to 15% on the dry basis. It may, if desired, be used in the form of an emulsion, which emulsion may be produced by heating water containing a protein stabilizing agent, such as either gelatin or casein, and a suitable alkaline solvent, by pouring therein hot molten asphalt while rapidly stirring the mixture.

In a similar manner, a starch solution containing about 2% to 3% of starch may be heated almost to the boiling point, and molted paraffin wax slowly poured therein with rapid agitation, whereupon, after cooling, a wax emulsion or dispersion will result. The asphalt emulsion and wax emulsion may then be mixed, and this mixture used either to produce the coatings or the integral impregnations as when introducing the emulsion into a slurry of a cementitious material. More specifically, it may be incorporated with a gypsum composition such as is used in making gypsum board. This particular use of the composition is described in profuse detail in applicant's already mentioned copending application Serial No. 585,791, now Patent Number 2,432,963, filed concurrently herewith. For instance, one use of the material in its emulsion form may be illustrated by the following example:

A plastic gypsum mass or slurry containing 1000 pounds of calcined gypsum is mixed with 100 parts of an emulsion containing 50 pounds of asphalt (dry substance) and 10 pounds of paraffin wax (dry substance). The asphalt-wax emulsion is produced by dispersing these two water-resistant materials by means of a protein dispersing agent. However, a suitable wax emulsion and a suitable asphalt emulsion may be prepared separately, and proper amounts of each added to the calcined gypsum slurry. The emulsion is added to the slurry in any convenient manner. In the case of light-weight gypsum board, the emulsion may be fed to the foam inlet which discharges the foam that is added to the gypsum slurry to produce a light-weight aerated gypsum product. The foam containing the asphalt-wax emulsion is then incorporated with the gypsum in the usual way, and the resulting mix dried at such a temperature that the mass attains a temperature of about 200° F. Both the asphalt and the wax should have a melting point below the drying temperature. It is necessary to melt the asphalt-wax mixture during the drying operation in order to obtain effective waterproofing. In view of this, it is necessary to use asphalt material whose ring-and-ball softening point is not above about 185° F., and to use a wax material having a melting point not above 165° F. An asphaltic product, derived from petroleum residues, and having a ring-and-ball softening point of about 110° F. is preferred.

Gypsum board produced in accordance with the above example, and containing the specified ratio of asphalt to paraffin wax, produced a finished board product having high water resistance. The amount of asphalt-wax mixture used should be about 5%, based on a dry substance ratio of gypsum board to asphalt-wax material. A workable range is between 5% and 15%. The ratio of asphalt to wax may vary between 1:1 and 10:1. The reason why the combination of asphalt with wax brings about such a striking increase in water resistance is not clearly understood. It is believed, however, that the asphalt seems to act as a vehicle for causing the deposit of wax particles upon the gypsum crystals in a form that is conducive towards water repellency.

While the following explanation is purely theoretical, it is offered as a plausible explanation of the otherwise anomalous results obtained. Asphalts, particularly those of petroleum origin, are, when cold, very poor solvents for paraffin waxes. The waxes, when molten, are, however, miscible with the molten asphalts. When such a mixture cools, however, the wax will separate out. When used in the proportions herein set forth, the wax will separate in the form of extremely minute particles which at the surface of the cooled mixture may slightly protrude, producing an effect like that of a nasturtium leaf, on which, as is well known, water drops will run about like drops of mercury, without wetting the leaf. This would produce the effect of having the water assume a negative meniscus relative to the coated surface, and may therefore account for the immensely lowered water absorption. This explanation is also in accord with a further observation, namely, that if the water-absorption test is made at a temperature at or above the softening point of the wax-asphalt mixture, the water absorption suddenly greatly increases. It is known that both asphaltic substances and wax are at least wettable by water, and while they may prevent access of water to the coated crystals, will not necessarily produce the phenomenon of a negative meniscus. On the assumption of microscopic protruding wax crystals or particles, the effect, however, can at least be explained. The explanation also fits in well with the observed effect that mixtures outside of the preferred range do not produce the desired results.

Regardless of whether or not the above theory is correct, experimental facts have demonstrated that a particular and critical combination or ratio of asphalt and paraffin wax will produce these unusual improvements in water resistance.

Further proof as to the remarkable and unexpected results is illustrated in the table given below:

[21 hour water absorption, 7" square ½", 1500 lbs. per M sq. ft. gypsum board, paper-sealed, edges open]

| Percent paraffin Wax | Percent Water Absorbed | | | | | | |
|---|---|---|---|---|---|---|---|
| 2.28 | 75 | | | 24 | 6 | | |
| 1.42 | | | | 17 | | | |
| 1.00 | 75 | | 40 | 38 | 4 | 2 | 3 |
| .500 | | 65 | 33 | | 33 | 23 | |
| 0 | 71 | | 72 | | 71 | 65 | |
| Percent Asphalt | 0 | 1.24 | 1.65 | 2.48 | 4.14 | 8.28 | 9.99 |

In the above table, the asphalt (dry basis) is plotted against the paraffin wax (also dry basis) and the figures in the body of the table, as indicated by the heading "Per cent water absorbed," are in terms of per cent of water absorbed by the sample upon 21 hours' immersion. It should be particularly noticed that as much as 2.28% of paraffin wax when used alone still failed to properly waterproof the material, as it showed a 75% water absorption, which is approximately the same as a sample containing no wax at all. As to the asphalt, even 8.28% thereof, when used alone, brought down the water-absorption only by 6% (i. e., to 65%). Notice, however, the astounding effects of the conjoint use of wax and asphalt. Even when as little as 1.0% of wax and 4.14% of asphalt was conjointly used, the water absorption dropped to 4%. I have marked off the upper right-hand corner of my table with dash lines in order to draw attention to the highly effective area of the table. The effective range of ratios of paraffin wax to asphalt lies somewhere between 1.0 of wax to from about 1 to 10 of the asphaltic material. While natural asphalts are satisfactory, I find that the petroleum residue type of asphalt gives desirable results.

While the preferred method of this invention involves the use of a ready-made asphalt-wax emulsion which has been dispersed by a protein material, the present invention is not limited to this type of emulsion. One may use other emulsifying materials in place of protein. For example, one may use soaps, clay or bentonite, various wetting agents such as the sulfated or sulfonated fatty alcohols and fatty acids, various amine soaps, and various starch and dextrin materials. For example, one may purchase a ready-made asphalt emulsion and mix this with a separately procured paraffin wax emulsion or a wax emulsion prepared by dispersing paraffin into a starch paste, or one may produce the desired asphalt-wax emulsion by mechanical means.

Emulsions of either wax or asphalt can readily be prepared by pouring the materials in the melted condition into a violently agitated mass of water which contains a protein dissolved therein. Many methods of preparing emulsions in this manner are described in the literature; for instance, in W. Clayton's "Emulsions and Emulsification"; and Harry B. Weiser's "Colloid Chemistry."

Regardless of how the emulsion is produced, the important factors are the use of an emulsion or emulsion mixtures containing the proper ratio of asphalt and wax, and also having the ability of blending in such a manner as to bring about, after the subsequent breaking of the emulsion in the gypsum mix, a deposit of asphalt containing paraffin wax particles in a form in which the inter-surface tensions are such as to produce the greatly increased water resistance herein described.

While the softening point of the asphalt has been given as about 115 F., the principles of the present invention can be realized with higher softening point asphalts, say up to 185° F., and with paraffin waxes melting as high as 165° F. Other waxes which are relatively insoluble in asphalt when the latter is cold may be substituted, with substantially equivalent results, for the paraffin wax. However, the latter, on account of its ready availability and low price, is by far to be preferred. It will of course be obvious that the composition should be used upon objects which during their ordinary use would not be subjected to temperatures where the composition will melt and run off. It is, however, eminently useful for the treatment of surfaces which are subjected to the action of water and, for instance, may be used with very telling effect for the coating or painting of iron objects which are subjected to water, such for instance as piling, railings, and various parts of ships such as ships' bottoms and the like. The composition has a sort of gray appearance, which upon closer examination is found to be due to the minute particles of wax which seem to be oriented on the surface of the asphalt, but undoubtedly penetrate throughout the body thereof, where they are, of course, invisible.

The particular advantage of the present composition lies in the unique combination of its properties. As will have been noted from the experiment hereinabove described, the wax by itself will not properly adhere to a non-absorbent surface, and is readily fluxed therefrom by water, as witnessed by the fact that the water practically removed the wax from the glass plate. The asphalt, on the other hand, exhibits excellent wettability of its own to the glass to which it tenaciously adheres. However, the asphalt in turn is easily wetted by water. While for ordinary waterproofing purposes asphalt alone is eminently satisfactory, particularly where the object coated has no pores and where the wetting of the asphalt is of no particular concern, yet where inherently porous materials are encountered which, although they can be rendered waterproof in the sense that any water entering them will not wet them, will nevertheless be rendered non-water-absorbent by the fact that their own minute pores are coated with this composition which cannot be flushed therefrom because the asphaltic component adheres to the material while the wax particles repel the water and keep it from entering the pores in the first place.

While asphalt has been mentioned herein, it is to be understood that this may be either the so-called natural variety, such as a Trinidad asphalt, or an artificial product such as the asphaltic residues from oil treating and oil cracking operations.

The invention is to be sharply differentiated from a use of either wax alone or asphalt alone. It was well known that either of these materials by themselves will render materials waterproof, but water-repellence which is attainable by the use of the present invention is something far above mere waterproofing, as commonly known in the art. Accordingly, applicant claims as his invention:

1. Process of producing a coating relatively non-wettable by aqueous fluids which comprises applying to a heat resistant article a coating composition consisting essentially of paraffin wax having a melting point of from about 122° F. to about 165° F. and a petroleum-base asphalt having a melting point between about 110° F. and about 185° F. in the relative proportion of from about 1 to about 10 parts of said asphalt to one part of said paraffin wax, heating the coated article to a temperature sufficient to render the coating fluid, and then cooling the article, whereby the paraffin wax becomes distributed in the cooled coating in the form of individual minute particles, some of which, at least, protrude individually from the exposed surface of the coating.

2. Process of coating heat resistant objects with a water repellent coating which comprises applying thereto an aqueous emulsion containing paraffin wax and an asphalt of petroleum origin having a melting point within the range of from about 110° F. to about 185° F., drying the coated object to remove the water contained in said emulsion therefrom, heating the coating on the thus coated object to effect a temporary solution of the wax in the asphalt contained in said coating, and cooling the latter, whereby the paraffin wax will separate out in minute crystals some of which, at least, protrude individually from the exposed surface of the coating.

3. A water-repellent non-wettable coating composition for cementitious materials, whereby they will be rendered substantially non-water-penetrable, consisting essentially of one part of paraffin wax and from about four to about ten parts of a petroleum base asphalt having a melting point of from about 110° F. to about 150° F., the wax being dispersed in a continuous phase of asphalt in the form of minute discrete particles, some of which appear on the surface of the coating composition.

THOMAS P. CAMP.

(References on following page)

REFERENCES CITED

The following references are of record in the file of this patent:

UNITED STATES PATENTS

| Number | Name | Date |
|---|---|---|
| 415,864 | Gilson | Nov. 26, 1889 |
| 520,819 | Caffall | June 5, 1894 |
| 877,888 | Forrest | Jan. 28, 1908 |
| 1,787,629 | Kennedy | Jan. 6, 1931 |
| 1,826,699 | Charch | Oct. 6, 1931 |
| 2,015,739 | Winning | Oct. 1, 1935 |
| 2,291,905 | Koenig | Aug. 4, 1942 |
| 2,299,144 | Heritage et al. | Oct. 20, 1942 |

OTHER REFERENCES

Abraham: "Asphalts and Allied Substances," IV ed., page 484; published by D. Van Nostrand Co., New York, 1938.